(12) United States Patent
Poitras

(10) Patent No.: US 7,163,451 B1
(45) Date of Patent: Jan. 16, 2007

(54) REGIONAL ABATTOIR WITH MOBILE UNIT AND METHOD OF USE

(75) Inventor: Jean-Yves Poitras, DuBuisson (CA)

(73) Assignee: Corporation de développement industriel et commerciale de la région de Val-d'Or, Québec (CA)

( * ) Notice: Subject to any disclaimer, the term of this patent is extended or adjusted under 35 U.S.C. 154(b) by 0 days.

(21) Appl. No.: 11/169,617

(22) Filed: Jun. 30, 2005

(51) Int. Cl.
*A22B 5/00* (2006.01)

(52) U.S. Cl. ...................................................... 452/52
(58) Field of Classification Search ................. None
See application file for complete search history.

(56) References Cited

U.S. PATENT DOCUMENTS 4,337,549 A * 7/1982 Anderson et al. ........... 452/173
5,538,466 A * 7/1996 Sandstrom ................... 452/52

FOREIGN PATENT DOCUMENTS

SE 448144 1/1987

* cited by examiner

*Primary Examiner*—Thomas Price
(74) *Attorney, Agent, or Firm*—Ogilvy Renault LLP; Pierre T. A. Nguyen

(57) ABSTRACT

A regional abattoir system is comprised of a permanent animal containment enclosure provided in a geographic region containing a plurality of animal suppliers. The permanent abattoir containment enclosure is adapted to house a predetermined number of animals to accustomize the animals to non-stressful environment prior to being slaughtered. The containment enclosure has an internal isolated slaughter room which has a door opening for communication with an external mobile abattoir. The mobile abattoir has a receiving station where a slaughtered animal is transferred to an overhead conveyor and processed into a skinless carcass for inspection and identification stamping prior to being refrigerated. This regional abattoir system serves small animal suppliers in sectors of a predetermined region whereby the animals are not transported large distances thereby minimizing stress and bruising of the animals and thereby producing better quality meat.

21 Claims, 7 Drawing Sheets

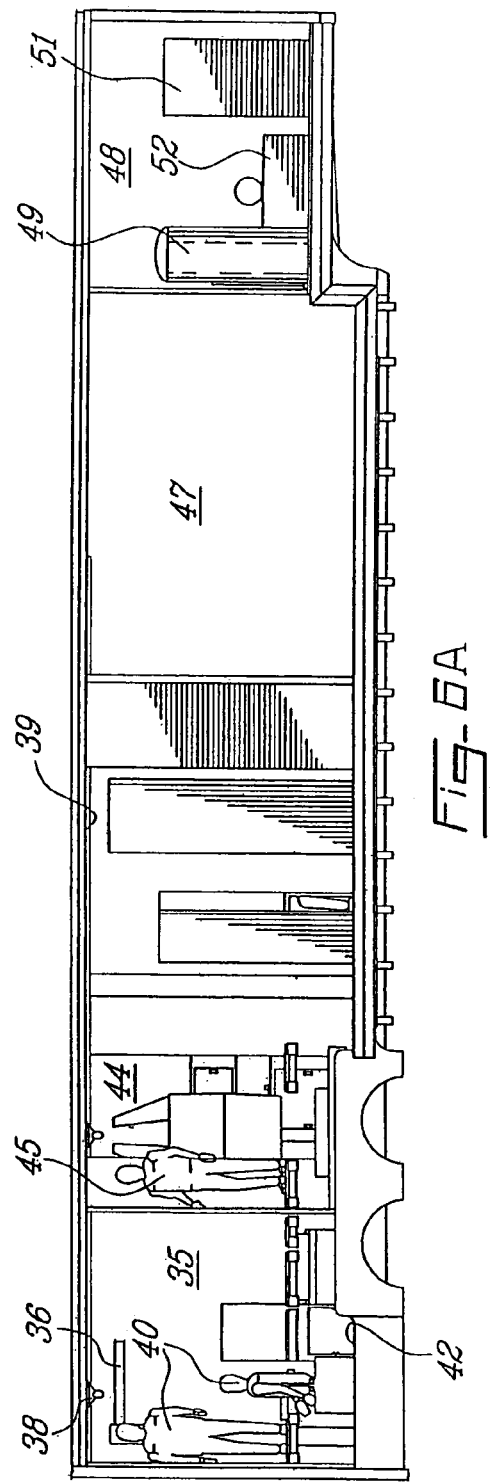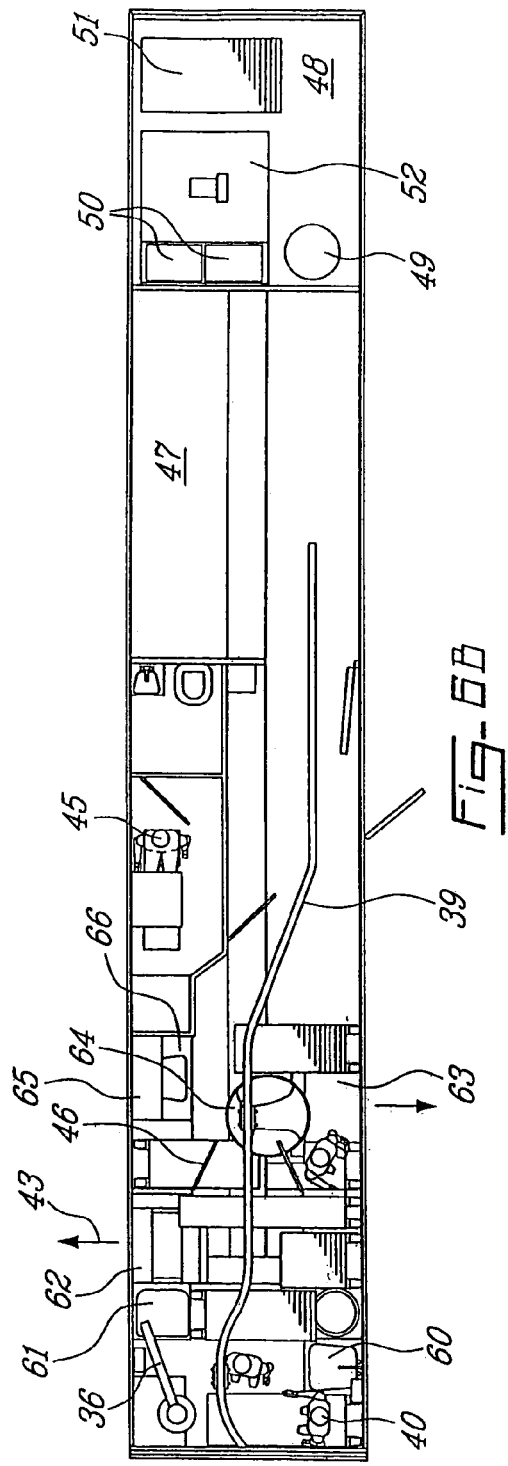

REGIONAL ABATTOIR WITH MOBILE UNIT AND METHOD OF USE

TECHNICAL FIELD

The present invention relates to a regional abattoir system which is comprised of a permanent animal containment enclosure provided with an internal slaughter room which communicates with an external mobile abattoir.

BACKGROUND ART

In the processing of animals destined for human consumption and particularly animal producers usually need to transport their animals to a containment building where an auctioneer sells the animals to brokers and/or meat processors who then transport the animals to abattoirs. Thus, the animal producer and the brokers and/or processors need to load the animals in trucks and sometime transport then long distances. During transportation the animal is in a confined area and not fed nor provided water. The animals being in closed quarters often are in contact with one another and this bruises the skin of the animal often leaving blue marks on the carcass after the animal has been processed in a slaughter house. Also when the animals are delivered to the slaughter house they arrive stressed and are further subjected to a stressful environment and this has been known to affect the quality of the meat.

Another problem nowadays is that there are very large animal suppliers who have their own slaughter houses and who sell meat in very large quantities to meat distributors and large retailers. This makes it very difficult for the small animal producer to compete on the marketplace as there are too many intermediates between the small animal producer and the retailer and the result of this is that the small producers are not profitable operations and are often discouraged from continuing such business. Their products are often destined for small local retailers.

Another problem that exists with small suppliers is that when their cattle or animals are sent to auction they are usually placed in groups of animals with other producers and the carcass of his animals cannot be inspected by him nor is that carcass identified by the retailer to give credit to the supplier for the quality of his product. The traceability of the cut meat products derived from his carcasses do not identify the animal supplier but often the broker. The identity of the producer is not known to the retailer.

Reference is also made to U.S. Pat. No. 5,538,466 and Swedish Patent No. 448,144 which describe the construction of a mobile abattoir. However, those mobile abattoirs are slaughter houses and they are brought to an area where they are installed in a permanent manner and refrigerated trucks are used to transport processed carcasses directly from the mobile abattoir.

SUMMARY OF INVENTION

Is therefore a feature of the present invention to provide a regional abattoir system with a mobile abattoir unit and a method of use which substantially overcomes the above-mentioned disadvantages of the prior art.

Another feature of the present invention is to provide a regional abattoir which is comprised of a permanent animal containment enclosure wherein animals are accustomized and subjected to a non-stressful environment prior to being slaughtered and processed in an external mobile abattoir which can service a plurality of these containment enclosures.

Another feature of the present invention is to provide a regional abattoir system which services a plurality of animal suppliers in a given geographic location whereby the distance of transport of the animals is greatly reduced whereby not to subject the animal to an excessive stressful environment.

Another feature of the present invention is to provide a regional abattoir system which incorporates therein a slaughter room where the animal is anesthetized and then processed into an external mobile abattoir.

Another feature of the present invention is to provide a regional abattoir system as above-described and wherein the animal is slaughtered and processed in a mobile abattoir and refrigerated in an internal refrigerated room thereof and wherein the mobile abattoir is self sustaining.

Another feature of the present invention is to provide a method of producing quality meat for human consumption utilizing a permanent animal containment enclosure where the animals are accustomized and then anesthetized one at a time in a non-stressful environment and then transferred into the mobile abattoir for processing into a carcass for human consumption.

Another feature of the present invention is to provide a method of producing quality meat for human consumption wherein the animal producers are identified with their carcass and wherein the costs of transporting the animal to an auction site for the sale of the animals in groups to brokers, is eliminated.

Another feature of the present invention is to provide a method of producing quality meat for human consumption and wherein the animal carcass is provided with a code identifying its producer in association with a specific geographic location.

According to the above features, from a broad aspect, the present invention provides a regional abattoir system comprising two or more permanent animal containment enclosures, each enclosure being provided in a geographic region containing a plurality of animal suppliers. Each of the permanent animal containment enclosures is adapted to house a predetermined number of animals to accustomize the animals to a non-stressful environment prior to being slaughtered. The containment enclosure has an internal isolated slaughter room. The slaughter room has a door opening for communication with an external mobile abattoir. The mobile abattoir has a receiving station where a slaughtered animal is transferred to an overhead conveyor and processed into a skinless carcass which is inspected and identified with a code stamping prior to being transferred to a refrigerated environment in the mobile abattoir, and sanitary containment means for receiving blood from the animal isolated from the receiving station, the animal at the receiving station being skinned and de-limbed prior to transfer to a gut removal station for inspection by a veterinarian.

According to a further broad aspect of the present invention there is provided a method of producing quality meat for human consumption and wherein the meat is traceable to a regional supplier. The method comprises the steps of providing two or more permanent containment enclosures, each of the enclosures being in a sector of a geographic location to receive animals from a plurality of designated animal suppliers located in the sector of the geographic location. A mobile abattoir is adapted and travels to the permanent containment enclosure. A predetermined number of animals are accustomized within the permanent animal containment enclosure for a predetermined period of time to subject the animals to a non-stressful environment. The animals are anesthetized and slaughtered in an isolated area of the containment enclosure and then processed into a carcass suitable for human consumption in the mobile abattoir. The processing includes bleeding the animal and collecting the blood in a sanitary containment means of the mobile abattoir isolated from the receiving station, and transferring the carcasses to a refrigerated station of the mobile abattoir for the refrigeration.

BRIEF DESCRIPTION OF DRAWINGS

A preferred embodiment of the present invention will now be described with reference to the accompanying drawings in which:

FIG. 6A is a transverse section view of the mobile abattoir;

FIG. 6B is a top section view of the mobile abattoir; and

DESCRIPTION

Figure 1:
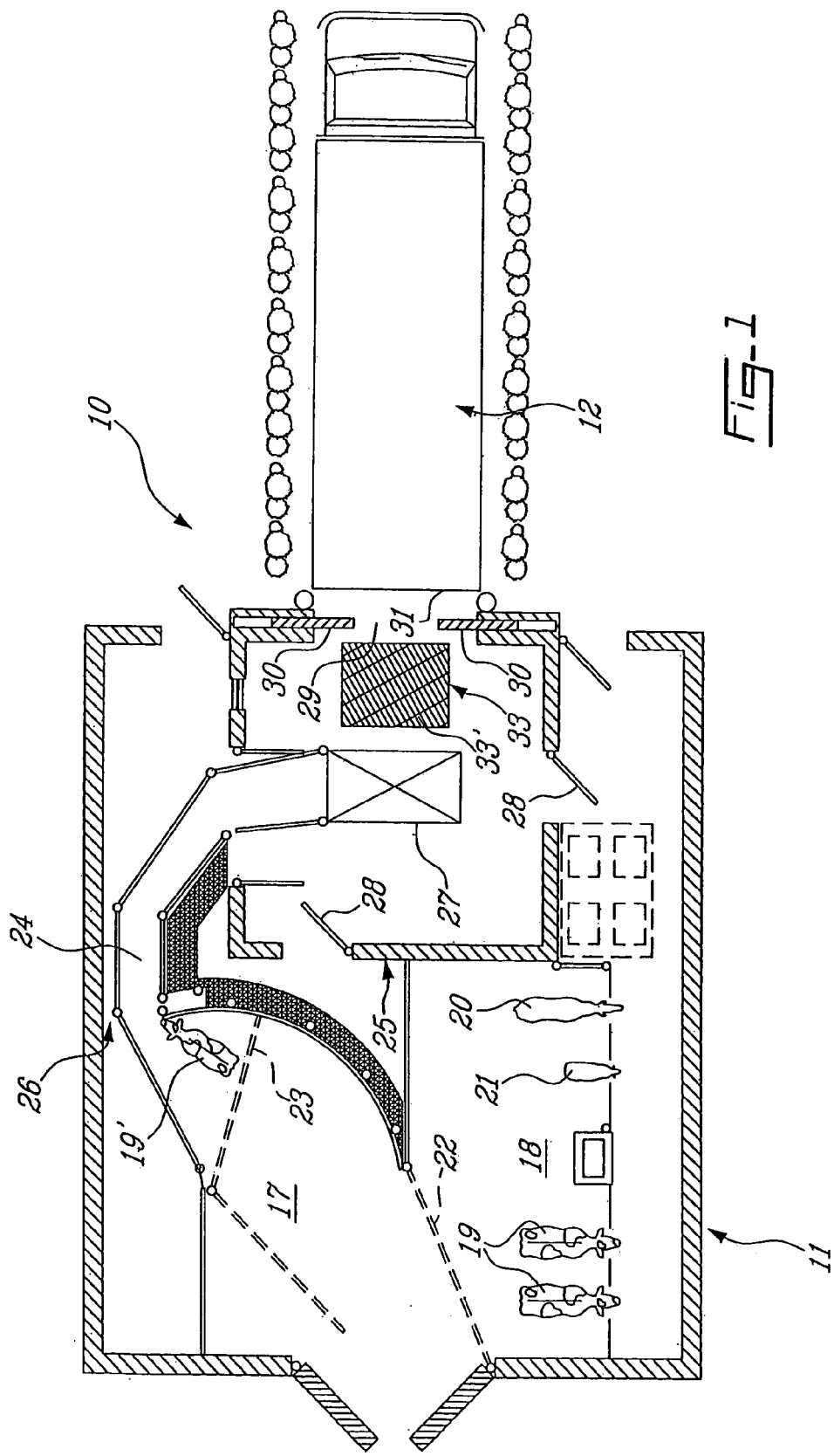
FIG. 1 is a schematic top section view of the regional abattoir system of the present invention and comprised essentially of a permanent animal containment enclosure and an external mobile abattoir coupled thereto.

Referring now to the drawings and more particularly to FIG. 1 there is shown generally at 10 the regional abattoir system of the present invention and comprising essentially a permanent animal containment enclosure 11 and an external mobile abattoir 12. This regional abattoir system was conceived primarily to service a plurality of small animal suppliers located in geographic regions that are often far from large scale abattoirs or auction sites capable of bringing the animal products to market.

Figure 3:
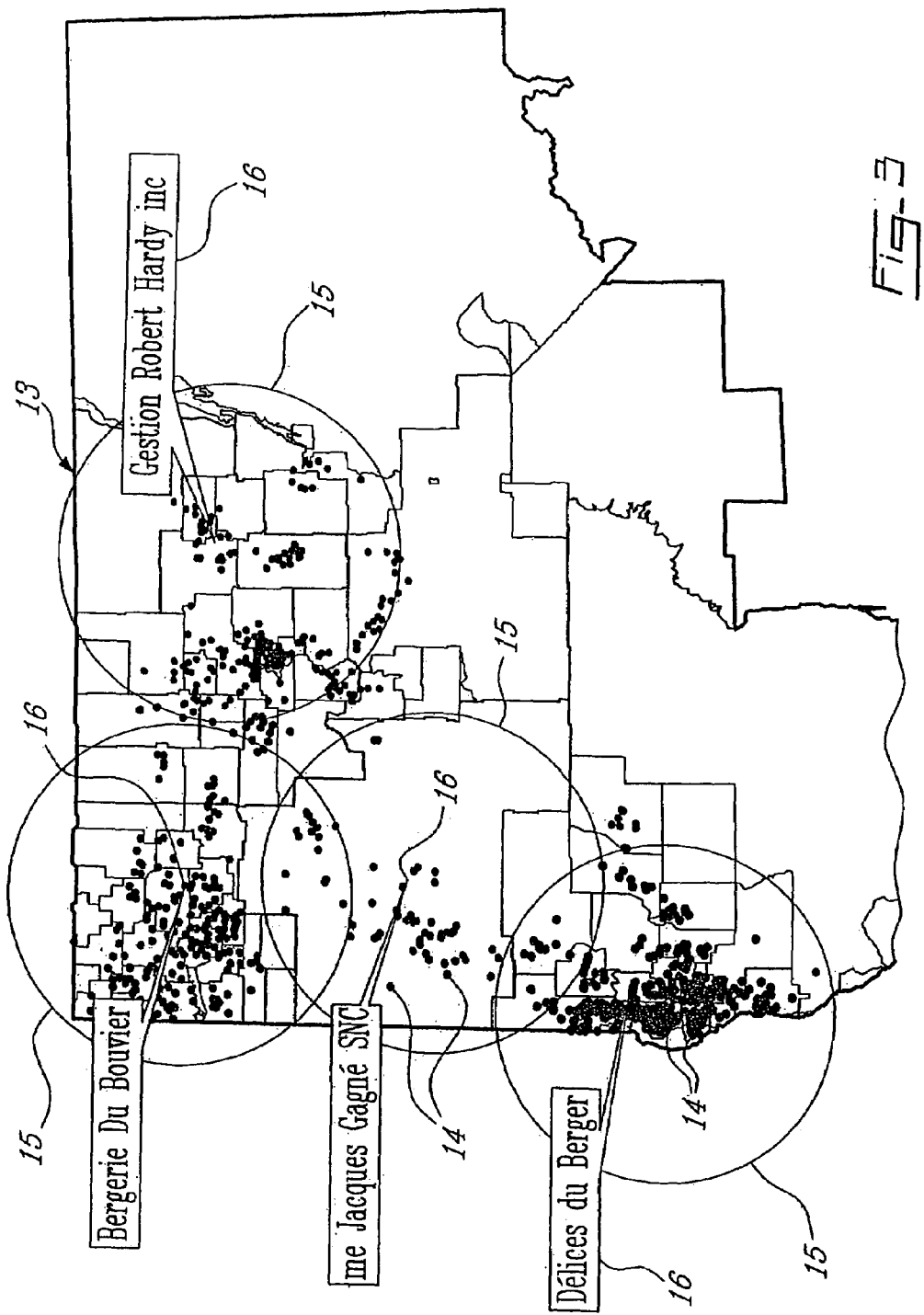
FIG. 3 is a plan view showing a plurality of permanent animal containment enclosures located in a predetermined geographic location which has been sectioned into supplier sectors.

As shown in FIG. 3 there is illustrated generally at 13 a predetermined geographic location and a location of animal suppliers 14 therein. This geographic location 13 is hereinshown as having been sectioned into supplier sectors 15, four of them being shown in FIG. 3. A permanent animal containment enclosure 11 is constructed in these sectors 15 and usually in an area which is easily accessible to all of the animal suppliers 14 within the sectors. Accordingly, the travel time for the animal suppliers to bring their animals to be slaughtered is greatly reduced. As shown, there are four permanent animal containment enclosures 11 constructed in an associated one of the sectors and their location is identified herein by the operators 16. The sectors are designated by a distance radius from the operators 16. With this system the animal suppliers 14 are capable of transporting their animals or have their animals transported within a few hours of transport time whereby not to overly stress the animals. These animal suppliers may not have large quantities of animals and therefore the regional abattoir system is constructed to handle small numbers of animals such as twelve beef cattle, or fifteen deer or sixty lambs or sheep. It is also pointed out that the mobile abattoir 12 is displaceable between these permanent animal containment enclosures 11.

Referring again to FIG. 1 it can be seen that the permanent animal containment enclosure 11 is provided with a corral area 17 and an accustomizing area 18 where, as hereinshown, beef cattle 19 or deer, pork, ostrich 20 or sheep and lamb 21 are being accustomized and fed hops or dietary feed which may be prescribed for a specific animal. The animals are further inspected by a veterinarian. It is likely that an animal could spend several hours in this accustomizing area depending if the animal has been subjected to a lot of stress. A displaceable gate 22 separates this area from the corral area. The permanent animal containment enclosure is an insulated building structure constructed for year round operation.

Figure 7:
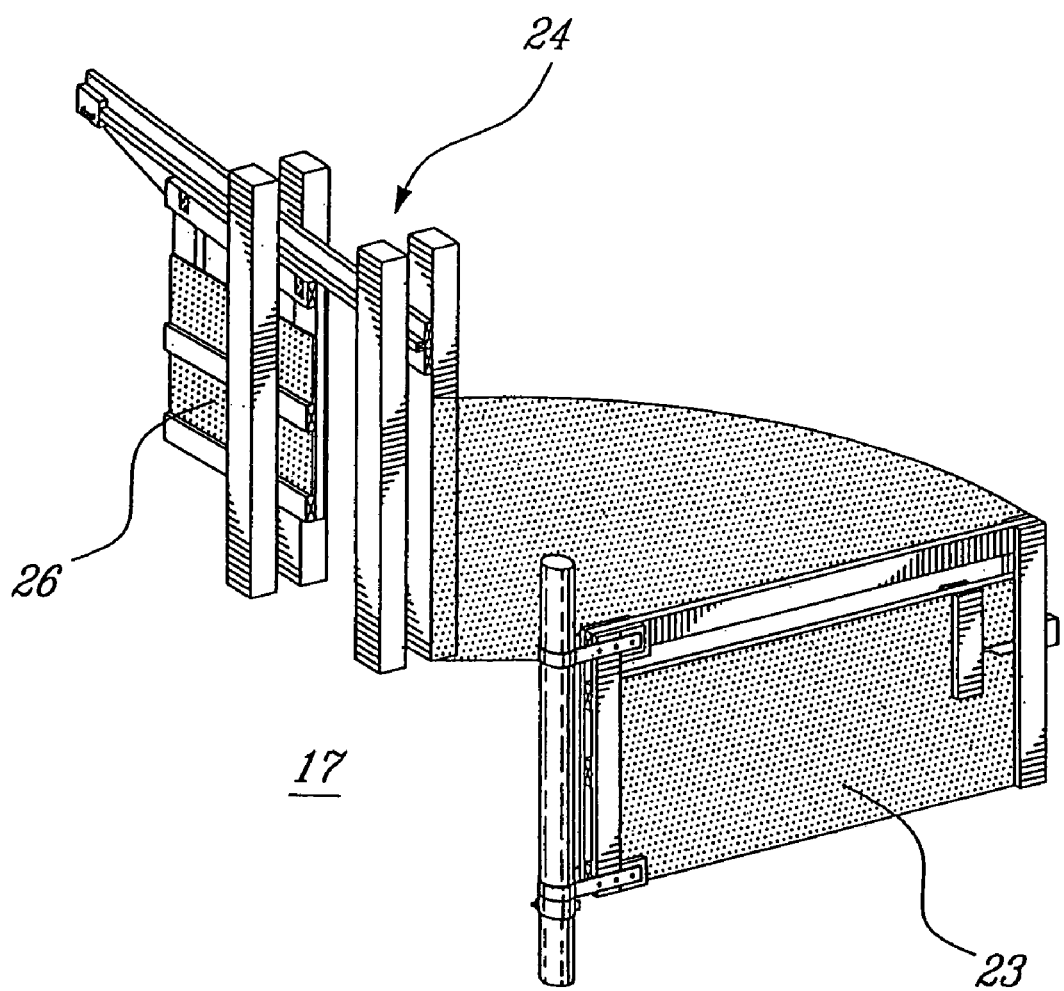
FIG. 7 is a perspective view showing a section of the corral area of the permanent animal containment enclosure.

When the animal is deemed to be fit for slaughter then each animal, such as the one identified by reference numeral 19', is separated in the corral area 17 and caused to move, by the displaceable gate 23, to an entrance area 24 which leads to an internal isolated slaughter room 25 which is completely isolated from the accustomizing area 18 or corral area 17 so that the animals are not further stressed by the sound caused by the animal or personnel working in the slaughter room. A displaceable gate 26 (see FIG. 7), will lead the animal into the entrance area 24 when the gate 23 pushes the animal in that area. The animal is then brought into a containment structure 27 where the animal is restrained and then anesthetized with a percussion tool well known in the art. The anesthetized animal is then slid on a reception platform 33.

The slaughter room 25 is provided with access doors 28 to provide access to personnel thereto. It is also provided with a large door opening 29 where thermally insulated sliding doors 30 are installed to permit communication to the rear end 31 of the mobile abattoir 12. A retractable shelter 34 is mounted about the opening 29 exteriorly thereof to shield the rear end 31 of the mobile abattoir 12 from outside weather when coupled to the slaughter room 25 of the permanent animal containment enclosure 11.

Figure 4:
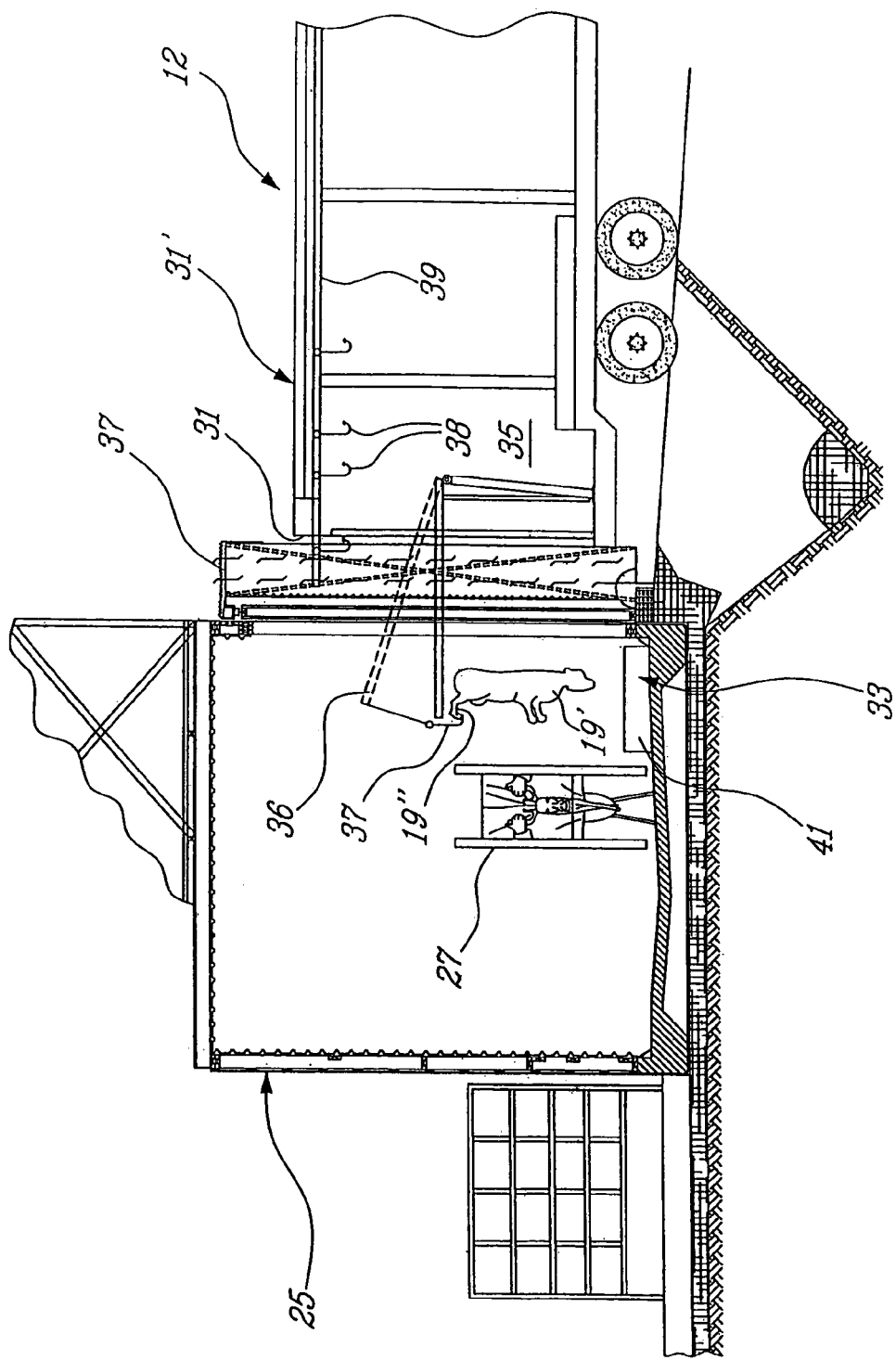
FIG. 4 is a partially fragmented side section view illustrating the coupling between the slaughter room in the permanent animal containment enclosure and the receiving station of the external mobile abattoir.
Figure 5:
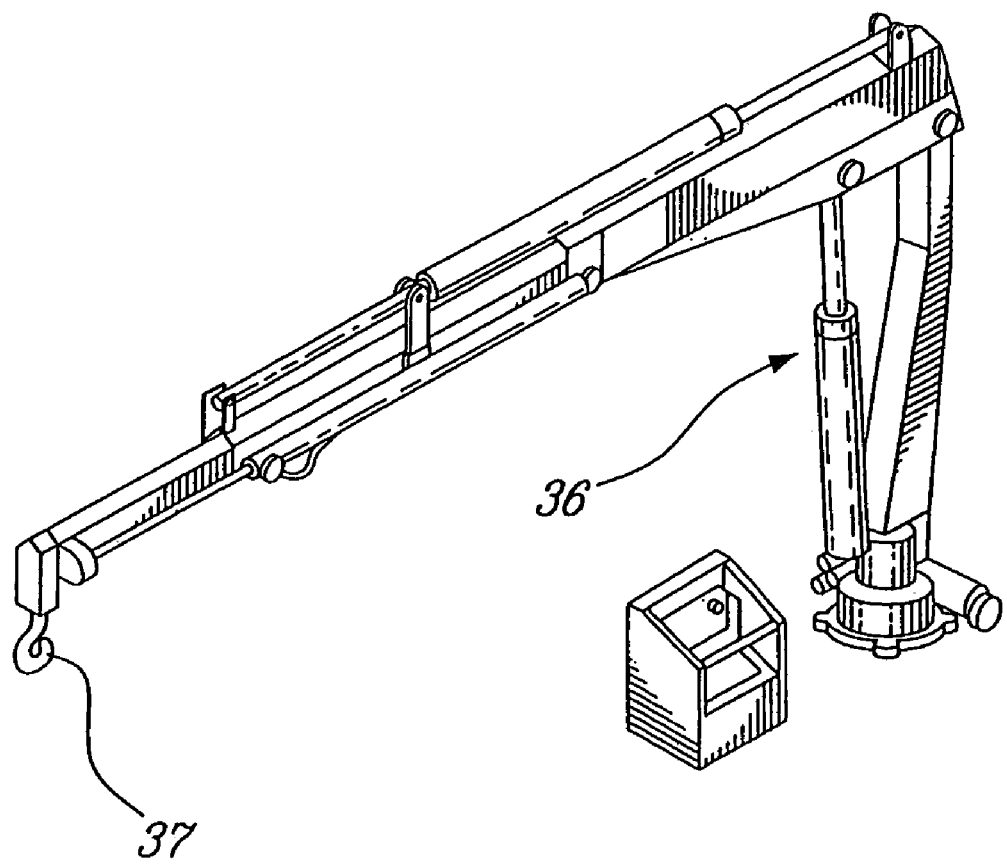
FIG. 5 is a perspective view of the extendable boom.

Referring now to FIG. 4 there is shown a rear end section 31' of the mobile abattoir. As can be seen, the rear end of the mobile abattoir 12 is provided with a receiving station 35 in which there is provided an extendable boom 36 which swings into the slaughter room 25 wherein the anesthetized animal 19' is hooked by its hind legs 19" by a hook 37 and hoisted above the platform 33. The animal is bled with blood collected in a stainless steel container 41 under the grate 33' of the platform and the head and legs are cut off. The head is washed on a washing basin and the skin is lifted from the front legs and these legs are out-off. Other standard functions are performed on the animal and it is then swung into the receiving station 35 of the mobile abattoir wherein the anesthetized animal 19 is transferred to a hook 38 on an overhead conveyor 39.

Figure 2:
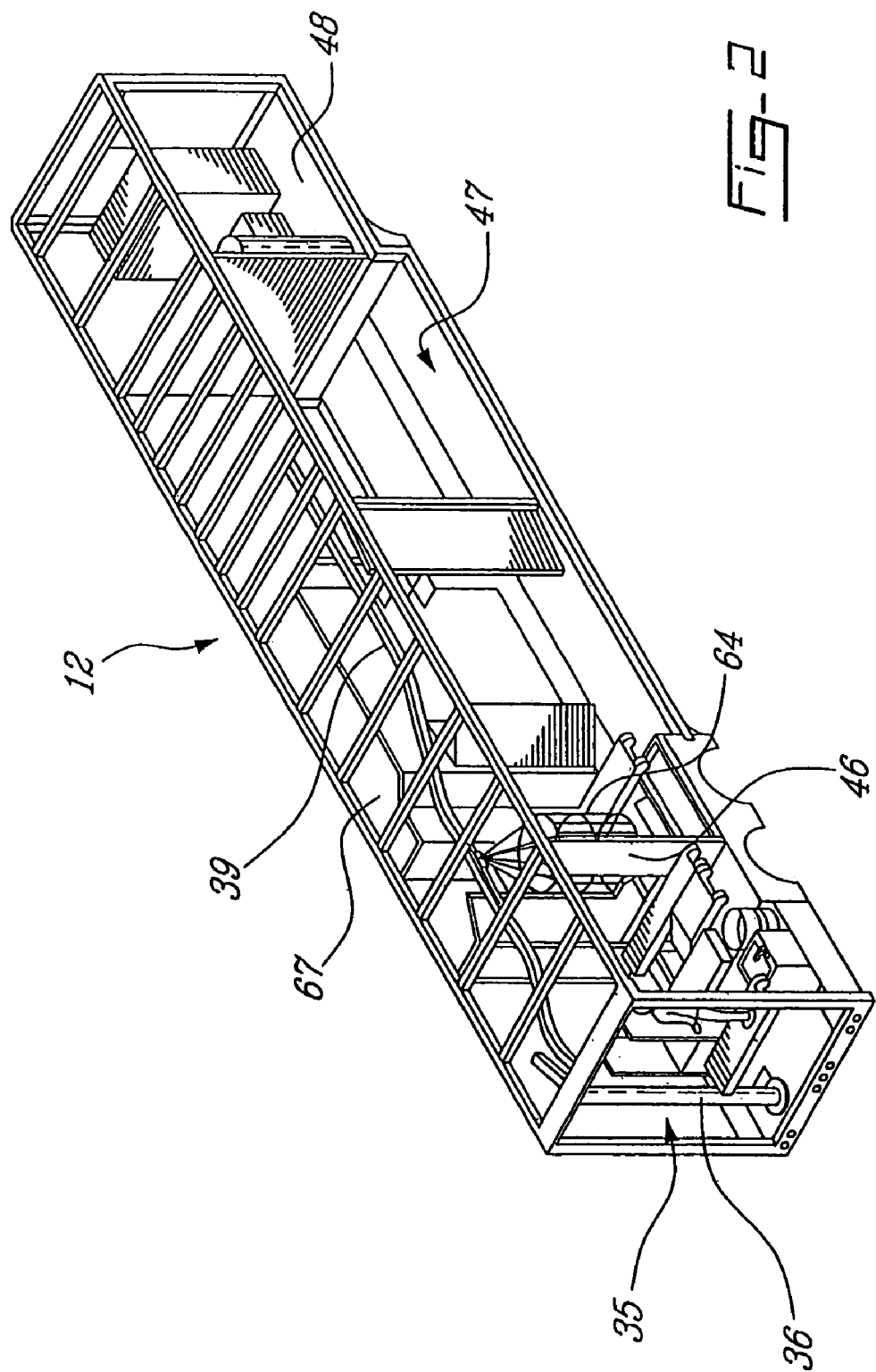
FIG. 2 is fragmented perspective view illustrating the construction of the mobile abattoir.

Referring now to FIGS. 2, 6A and 6B it can be seen that the receiving station 35 is staffed by one or two persons 40 working in the slaughter room 25 and experienced with abattoir work. The animal is skinned, and the skin is returned to the animal supplier at a receiving station outside the abattoir at location 43. The workers 40 effect this work with well known tools, obvious to person skill in the art and which are manually and automatically operated. The animal is transferred by the overhead conveyor 39 to a gut removal station 44 where a veterinarian 45 inspects the guts to make sure that there are no diseases in the animal. The carcass is then cut in half to form two carcasses and one of the workers or the veterinarian 45 will stamp both carcasses with an identification code which identifies the animal supplier of these carcasses for tracing the animal to the supplier in the specific sector of the geographic location. Doors 46 separate the receiving station 35 from the gut removal and inspection station 44 for sanitary purposes and the personnel working in the receiving station 35 are not permitted in that station so that there is no transfer of bacteria etc. The identified carcasses are then transferred by the overhead conveyor 39 to a refrigerated room 47 at the other end of the mobile abattoir.

As can be seen the front end of the abattoir is provided with a mechanical room 48 which houses a hot water tank 49, a compressor 50, a power generator 51, a pump 52 and any other pieces of equipment required to make the mobile abattoir self-sustaining.

With reference to FIGS. 6A and 6B various accessories of the mobile abattoir will now be identified. In the receiving station 35 there is provided a sink 60 and a head washing basin 61. A "de-skinning" machine 62 is also used to remove the skin of the animal and this is well known in art. At the next station where the guts are analyzed there is provided a gutter or shoot 63 to eject the guts out of the mobile unit into an external reservoir. Also, a carcass containment device 64 is used to split the carcass in a half and this type of apparatus is well known in the art. The veterinarian is also provided with a cabinet 65 to house instruments and a washing basin 66 for his use. A remote computer station is provided to enter the data relating to the carcass into the computer program to disseminate information relating to the carcass that just been processed.

Accordingly, one can appreciate that with the regional abattoir system as above-described which comprises a permanent animal containment enclosure strategically positioned in delineated sectors of a geographic area in combination with a mobile abattoir which services these permanent animal containment enclosures produces the many advantages of the present invention as above described. Accordingly, regional suppliers can produce quality meat for human consumption with the meat being traceable to the regional supplier such that such sector or region or supplier within the region can be identified with the quality of its products, thereby increasing the demand for such products. A region, or suppliers in a region, can therefore become famous for supplying a high quality product which is constant demand. Also, with the method as above-described the animals are not subjected to stressful environments and are not stressed ore buised before being slaughtered and this produces meat of superior quality. Still further, with the method and the system as above-described the auctioneer and broker have been eliminated from the chain of supply between the animal producer and the retailer and the suppliers become more competitive. When there is a demand for meat products from a specific region where there are several small suppliers, as illustrated in FIG. 3, the mobile abattoir can relocate to the permanent animal containment enclosure in that region and process carcasses therefrom and bring them directly to market.

The mobile abattoir is a tractor trailer unit as illustrated in FIG. 1 which measures approximately 53 feet in length and which is adapted for displacement on highways. Of course, the veterinarian is scheduled to visit the mobile abattoir whenever it is intended to process animals whereby the animals processed thereby are inspected in accordance with Government regulations. The abattoir is also constructed of many stainless steel parts and in a fashion for ease of cleaning and sanitation with hot water being supplied directly from the mechanical room 48. All of the piping and equipment are not illustrated herein but obvious to a person skill in the art. With the method of traceability the entire system is provided on a website for quick access to identify the suppliers by the code attributed thereto and contained on the carcass. This code is transferred on all of the meat cuts and appears on the labels which are generated by the computerized scales where the information is entered by the butcher. This system and method is also ideal for animal suppliers who raise bio-fed animals where there could be a noticeable difference in the taste of the meat produced by such animals.

It is within the ambit of the present invention to cover any obvious modifications of the preferred embodiment described herein, provided such modifications fall within the scope of the appended claims.

The invention claimed is:

1. A regional abattoir system comprising two or more permanent animal containment enclosures, each enclosure being provided in a sector of a geographic region containing a plurality of animal suppliers, each said permanent animal containment enclosures being adapted to house a predetermined number of animals to accustomize said animals to a non-stressful environment prior to being slaughtered, said containment enclosure having an internal isolated slaughter room, said slaughter room having a door opening for communication with an external mobile abattoir; said mobile abattoir having a receiving station where a slaughtered animal is transferred to an overhead conveyor and processed into a skinless carcass and then to further stations for inspection and code identification stamping prior to being transferred to a refrigerated environment in said mobile abattoir, and sanitary containment means for receiving blood from said animal isolated from said receiving station, said animal at said receiving station being skinned and de-limbed prior to transfer to a gut removal station for inspection by a veterinarian.

2. A regional abattoir as claimed in claim 1 wherein said permanent containment enclosure has a feed section and a corral section with a displaceable gate to isolate and direct an animal to be slaughtered to said isolated slaughter room.

3. A regional abattoir as claimed in claim 1 wherein said permanent containment enclosure is located substantially at a central location in said sector of said geographic region to provide to said plurality of animal suppliers a short distance of travel to transport their animals to said permanent containment enclosure to minimize stress to said animals and risk of bruising caused by transport vehicles and thereby affecting the quality of its meat.

4. A regional abattoir as claimed in claim 3 wherein said sector in said geographic region is delineated by a distance radius requiring less than a few hours of transport by said animal suppliers to transport their animals to said permanent containment enclosure.

5. A regional abattoir as claimed in claim 3 wherein said permanent containment enclosure is an insulated building structure constructed for year round operation, said door opening of said slaughter room communicating with a rear door opening thereof, said receiving station of said mobile abattoir being located at said rear end of said mobile abattoir.

6. A regional abattoir as claimed in claim 5 wherein hoisting means is provided in said receiving station and having and extendable boom to hook said slaughtered animal from its hind legs and transfer said animal into a hook of said overhead conveyor for displacement of said animal and an eventual carcass thereof along different stations of said mobile abattoir.

7. A regional abattoir as claimed in claim 6 wherein said animal is one of a beef, deer, pork, ostrich, sheep or lamb.

8. A regional abattoir as claimed in claim 1 wherein said mobile abattoir has a veterinarian inspection section and wherein said identification stamping includes a code which identifies specific ones of said animal suppliers.

9. A method of producing quality meat for human consumption and wherein said meat is traceable to a regional supplier, comprising the steps of;
  (i) providing two or more permanent animal containment enclosures, each said enclosures being in a sector of a geographic location to receive animals from a plurality of designated animal suppliers located in said sector of said geographic location,
  (ii) adapting a mobile abattoir which travels to said permanent containment enclosure,
  (iii) accustomizing a predetermined number of animals within said permanent animal containment enclosure for a predetermined period of time to subject said animals to a non-stressful environment,
  (iv) anesthetizing and slaughtering said animals in an isolated area of said containment enclosure,
  (v) processing said slaughtered animal in said mobile abattoir into a carcass suitable for human consumption, said processing including bleeding said animal and collecting blood in a sanitary containment means of said mobile abattoir isolated from said receiving station and;
  (vi) transferring said carcasses to a refrigerated station of said mobile abattoir for refrigeration.

10. A method as claimed in claim 9 wherein said animal containment enclosure further comprises an internal isolated slaughter room, and wherein prior to step (iv) said animals are corralled and directed into said slaughter room to be anesthetized and slaughtered.

11. A method as claimed in claim 9 wherein said step (iii) further comprises feeding said animals with hops or other feed products to which said animals are accustomed to.

12. A method as claimed in claim 9 wherein said step (iii) further comprises visually inspecting said predetermined number of animals by a veterinarian to determine the condition thereof to thereby evaluate the retention time of said animals or specific ones of said animals in said permanent animal containment enclosure.

13. A method as claimed in claim 9 wherein there is further provided before step (iii) the steps of (a) identifying the specific animal supplier of said predetermined number of animals in said containment enclosure, (b) providing a code to each said animal to identify said specific animal supplier associated with each said animals, and (c) placing said codes on said carcasses of said animals for traceability.

14. A method as claimed in claim 9 wherein prior to steps (i) there is provided the steps of:
  (a) analyzing a predetermined geographic location to determine the number of animal suppliers therein and their location in said geographic location,
  (b) sectionalizing said geographic location into supplier sectors, and constructing one of said permanent animal containment enclosure at a predetermined location in each said supplier sectors to minimize the travel time of said animal suppliers in said sectors to transport their animals to said permanent animal containment enclosure.

15. A method as claimed in claim 14 wherein said mobile abattoir is displaceable to a predetermined one of said permanent animal containment enclosures.

16. A method as claimed in claim 9 wherein said step (v) comprises (a) hoisting said slaughtered animal in a receiving station of said mobile abattoir and (b) transferring said slaughtered animal onto a hook of an overhead conveyor with said animal hooked from the rear legs thereof and (c) displacing said animal along different stations of said mobile abattoir.

17. A method as claimed in claim 16 wherein at said receiving station there is further provided the steps of de-skinning and severing limbs of said slaughtered animal and conveying said beheaded animal to a gut removal station.

18. A method as claimed in claim 17 wherein at said gut removal station the guts of said animals are removed and wherein there is further provided the steps of inspecting said guts and the carcass of said slaughtered animal by a veterinarian.

19. A method as claimed in claim 18 wherein there is further provided the steps of cutting said carcass in half and affixing an identification code to said half carcasses to identify said animal with its animal supplier.

20. A method as claimed in claim 9 wherein there is further provided the step of transferring said carcasses to refrigerated transport vehicles to transfer said refrigerated carcasses for market.

21. A method as claimed in claim 20 wherein said refrigerated carcasses are processed by a retailer into cuts of meat for sale to consumers, said identification code being transferred onto an information containment label produced by a computerized weigh scale at said retailer to provide for traceability of all said cuts of meat associated with said carcasses.

* * * * *